US010275109B2

(12) United States Patent
Fleming et al.

(10) Patent No.: US 10,275,109 B2
(45) Date of Patent: Apr. 30, 2019

(54) TRAVERSING BETWEEN NODES

(71) Applicant: ORACLE INTERNATIONAL CORPORATION, Redwood Shores, CA (US)

(72) Inventors: Michael Fleming, Dublin (IE); Jindrich Dinga, Santa Clara, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 42 days.

(21) Appl. No.: 13/899,022

(22) Filed: May 21, 2013

(65) Prior Publication Data

US 2014/0351766 A1   Nov. 27, 2014

(51) Int. Cl.
*G06F 3/048*      (2013.01)
*G06F 3/0481*    (2013.01)
*G06F 3/0489*    (2013.01)

(52) U.S. Cl.
CPC ........ *G06F 3/0481* (2013.01); *G06F 3/04892* (2013.01)

(58) Field of Classification Search
CPC ... G06F 3/0481; G06F 3/0482; G06F 3/04892
USPC ....... 715/854, 853, 767, 802, 819, 820, 821, 715/822, 829, 811
See application file for complete search history.

(56) References Cited

U.S. PATENT DOCUMENTS

| | | | |
|---|---|---|---|
| 6,892,360 B1 | 5/2005 | Pabla et al. | |
| 6,931,604 B2* | 8/2005 | Lane | 715/853 |
| 7,055,108 B2 | 5/2006 | Goloshubin et al. | |
| 7,134,089 B2* | 11/2006 | Celik et al. | 715/767 |
| 7,735,023 B1 | 6/2010 | Chadzelek et al. | |
| 7,844,637 B2 | 11/2010 | Gibson et al. | |
| 8,281,258 B1* | 10/2012 | Dixon | G06F 3/04892 715/819 |
| 2004/0041837 A1* | 3/2004 | Yamaguchi | G06F 3/0481 715/764 |
| 2006/0174214 A1 | 8/2006 | McKee et al. | |
| 2006/0277502 A1* | 12/2006 | Aoyama | G06F 3/0482 715/856 |
| 2008/0082927 A1* | 4/2008 | Kelts | G06F 3/0481 715/762 |
| 2009/0089415 A1 | 4/2009 | Lecomte et al. | |
| 2011/0113364 A1* | 5/2011 | Neil | G06F 3/0482 715/802 |
| 2011/0179390 A1* | 7/2011 | Morris | 715/854 |
| 2012/0293516 A1 | 11/2012 | Look et al. | |
| 2014/0108981 A1* | 4/2014 | Payzer et al. | 715/767 |

* cited by examiner

*Primary Examiner* — Alex Olshannikov
(74) *Attorney, Agent, or Firm* — Potomac Law Group, PLLC

(57) ABSTRACT

A system for traversing between nodes within a user interface receives a directional command from a user. The directional command is a command to move a focus away from a current node. The system also determines a next node to move the focus onto. The determining the next node is based on the relative positioning between the current node and the other nodes. The determining the next node is based on previous movements of the focus that were performed prior to moving the focus onto the current node. The system also performs movement of the focus from the current node onto the next node.

20 Claims, 10 Drawing Sheets

TRAVERSING BETWEEN NODES

FIELD

One embodiment is directed generally to a computer system, and in particular to a computer system that traverses between nodes within a user interface.

BACKGROUND INFORMATION

User interfaces allow a user to interact with computer systems. User interfaces can be used in computing devices, electronic devices (e.g., smart phones and tablets), office equipment, and household appliances (e.g., a television), for example. A user interface represents information and actions to the user by displaying corresponding icons and visual indicators. The icons and visual indicators can be positioned within user interfaces in different ways.

These icons and visual indicators can generally be considered to be "nodes." A user can traverse through the nodes to access an intended node. The user may be limited to using "up," "down," "left," and "right" directional commands to traverse through the nodes. The nodes of a user interface can represent objects such as files, programs, web pages, or commands. Accessing nodes allows a user to quickly execute commands, open content, and run programs.

SUMMARY

One embodiment is a system for traversing between nodes within a user interface. The system receives a directional command from a user. The directional command is a command to move focus away from a current node. The system also determines a next node to move the focus onto. Determining the next node is based on the relative positioning between the current node and the other nodes. Determining the next node is based on previous movements of the focus that were performed prior to moving the focus onto the current node. The system also performs movement of the focus from the current node onto the next node.

DETAILED DESCRIPTION

Figure 1:
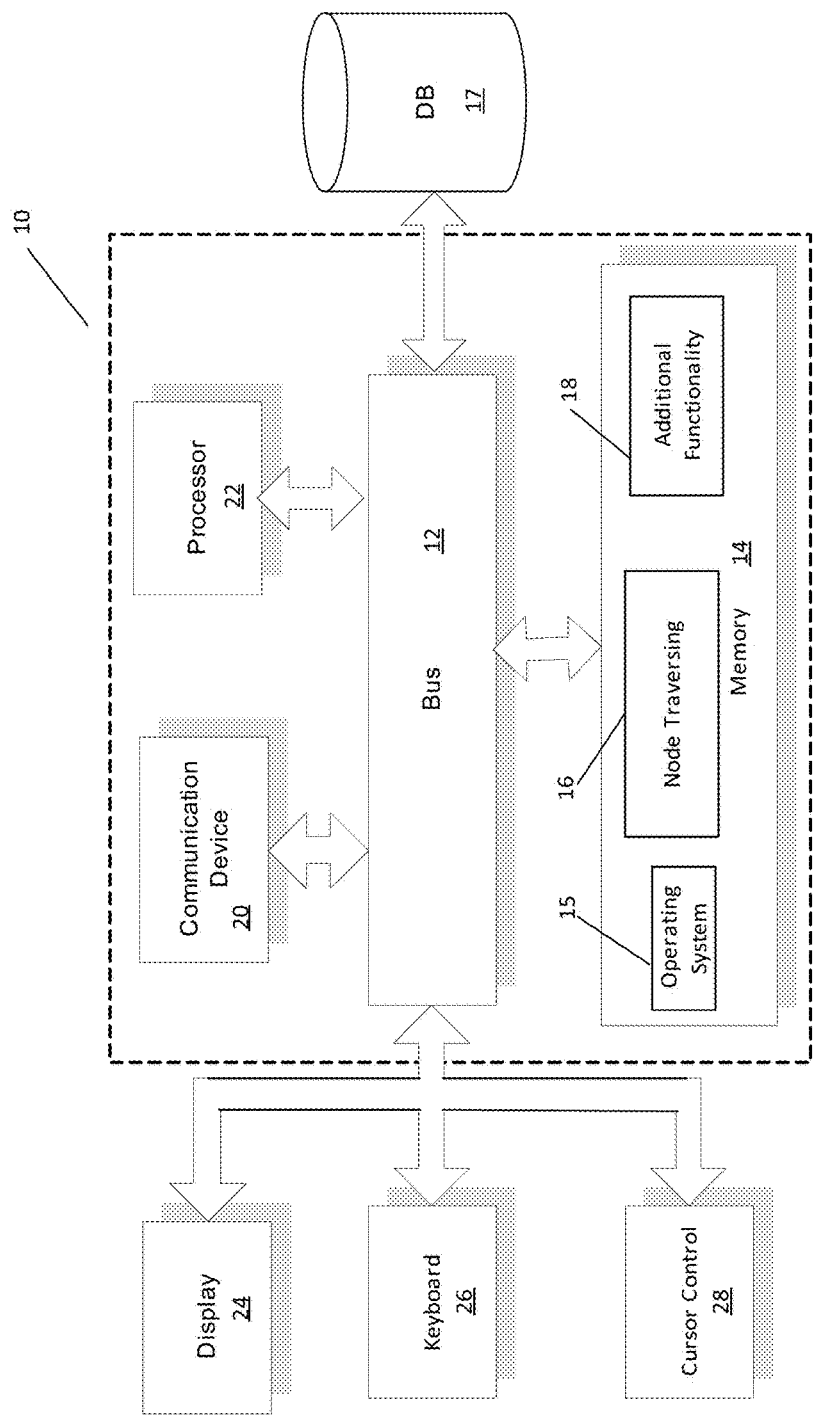
FIG. 1 is an overview block diagram of a computer system for traversing between nodes in accordance with an embodiment of the present invention.

One embodiment of the present invention allows a user to traverse between nodes within a user interface by determining a next node to traverse to. Traversing between nodes can be the moving of a focus from one node to another node. Embodiments use a plurality of algorithms to determine a next node to focus upon after moving the focus away from a current node. The algorithms can take into account factors such as the distances between the nodes, the positioning of the nodes with respect to each other, the sizes of the nodes, and the previous traversal choices/movements performed by the user, for example.

When using one embodiment, after traversing through a number of irregularly positioned nodes (e.g., nodes that are not positioned in neatly aligned rows/columns), a user may more readily reach an intended node. In other words, when using one embodiment of the invention, the user may avoid being skewed to an unintended node.

A user may have difficulty traversing through the nodes when the user is limited to using "up," "down," "left," and "right" directional controls/commands to perform the traversing. As described above, the user may have difficulties performing the traversing because the nodes may not be clearly aligned with respect to each other, and, thus, the user cannot neatly move through the nodes using the limited directional controls. Specifically, the user may have difficulties if at least one node is askew relative to the other nodes. Further, a user may have difficulties traversing through the nodes because certain nodes can disappear and/or move around.

When using the known solutions, when the user traverses through such a set of irregularly positioned nodes, the user is often skewed off of the user's intended path. Specifically, as the user traverses through the irregularly positioned nodes, skewing generally occurs after a number of moves in a same direction. One reason for the skewing can be attributed to the fact that the known solutions generally use traversal algorithms that determine the next node to focus upon based on only a current focused node/current position. The current node can generally be considered to be a node that is focused upon at the present time. To determine the next node to traverse to from the current node, the known approaches would generally perform a straightforward calculation that is based upon only the characteristics of the current node. In other words, the known approaches generally would not take into account other factors apart from the characteristics of the current node. Therefore, when a user traverses through nodes in accordance with the known approaches, the user may not be able to reach the user's intended node. In contrast to the known approaches, one embodiment of the present invention determines a next node to focus on based upon a variety of factors and thus allows the user to more readily reach the intended node.

One embodiment of the present invention determines how to traverse through nodes by performing a plurality of different calculations based on factors including: (1) historical information relating to previous nodes that have been traversed through to reach the current node; (2) characteristics of the current node; (3) which node corresponds to a traversal origin; (4) the sizes of the nodes other than the current node; and (5) calculated distances between the nodes, for example. With regard to the calculating of distances between the nodes, embodiments of the present invention can calculate the distances between a current node and the closest points of other nodes, the average distances between the current node and the sides of the other nodes, the distances between the center point of the center node and the center points of the other nodes, as described in more detail below. With respect to historical information relating to previous nodes that have been traversed through to reach a current node, one embodiment can include a listing of the different nodes which have been traversed through.

FIG. 1 is an overview block diagram of a computer system 10 for traversing between nodes in accordance with an embodiment of the present invention. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other known method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 may be further coupled via bus 12 to a display 24, such as a Liquid Crystal Display ("LCD"). A keyboard 26 and a cursor control device 28, such as a computer mouse, may be further coupled to bus 12 to enable a user to interface with system 10.

In one embodiment, memory 14 stores software modules that provide functionality when executed by processor 22. The modules include an operating system 15 that provides operating system functionality for system 10. The modules further include node traversing module 16 for traversing between nodes, as disclosed in more detail below. System 10 can be part of a larger system such as an interfacing system. Therefore, system 10 will typically include one or more additional functional modules 18 to include additional functionality, such as data processing functionality for processing information relating to the positioning/arrangement of nodes. A database 17 is coupled to bus 12 to store data used with modules 16 and 18.

Figure 2:
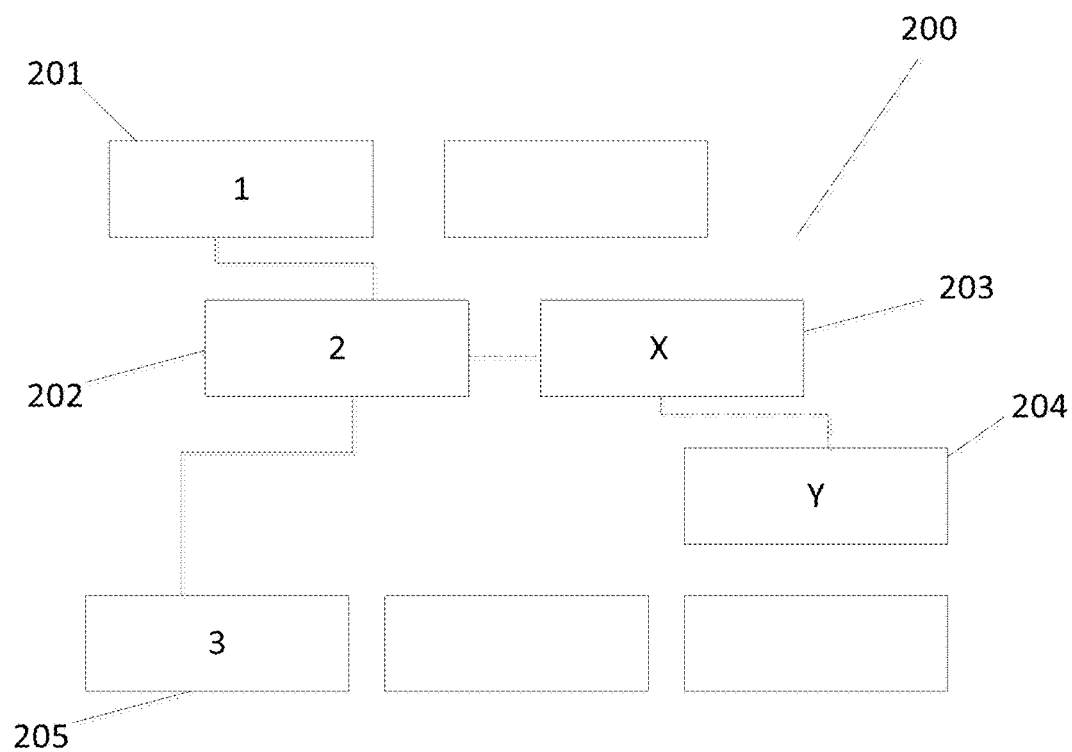
FIG. 2 is a screen shot of an interface that illustrates traversing between nodes in accordance with one embodiment.

FIG. 2 is a screen shot of an interface 200 that illustrates traversing between nodes in accordance with one embodiment. Assume, in a first scenario, node 201 is the current node (that is currently focused upon) and the user moves "down." After the user moves "down," one embodiment determines a next node to focus on based upon the direction indicated by the user and the relative positioning of other nodes relative to the current node. For example, after the user moves "down" from current node 201, one embodiment looks below (i.e., in rows below) the current node 201 to determine if any other nodes are within a column that is aligned with the column of node 201. In one embodiment, when the directional command is in the vertical direction (i.e., "up" or "down"), the embodiment determines if other nodes are column-aligned with the current node. For example, once the user moves "down" from node 201, node 202 becomes the current node because node 202 is below node 201, and because the column of node 202 is relatively column-aligned with the column of node 201. Next, assume the user moves "down" again from current node 202. Node 205 would then become the current node because node 205 is below node 202, and because the column of node 205 is relatively column-aligned with the column of node 202.

Assume that, in a second scenario, node 201 is the current node and the user again moves "down." After the user moves "down," similar to the aforementioned first scenario, node 202 becomes the current node because node 202 is below node 201, and because the column of node 202 is aligned with the column of node 201. Next, assume the user moves "right" from current node 202. One embodiment looks to the right (i.e., in the columns to the right of) current node 202 to determine if any other nodes are within a row that is aligned with the row of node 202. For example, once the user moves "right" from node 202, node 203 becomes the current node because node 203 is to the right of node 202, and because node 203 is aligned with the row of node 202. As described above, when the directional command is in the vertical direction, the next node is column-aligned with the current node. However, in this example, because the directional command is in the horizontal direction (i.e., "left" or "right"), the embodiment determines if other nodes are row-aligned with the current node. As such, node 203 then becomes the current node. Next, assume the user moves "down" from current node 203. Node 204 can then become the current node because node 204 is below current node 203, and because the column of node 204 is aligned with the column of current node 203.

Figure 3:
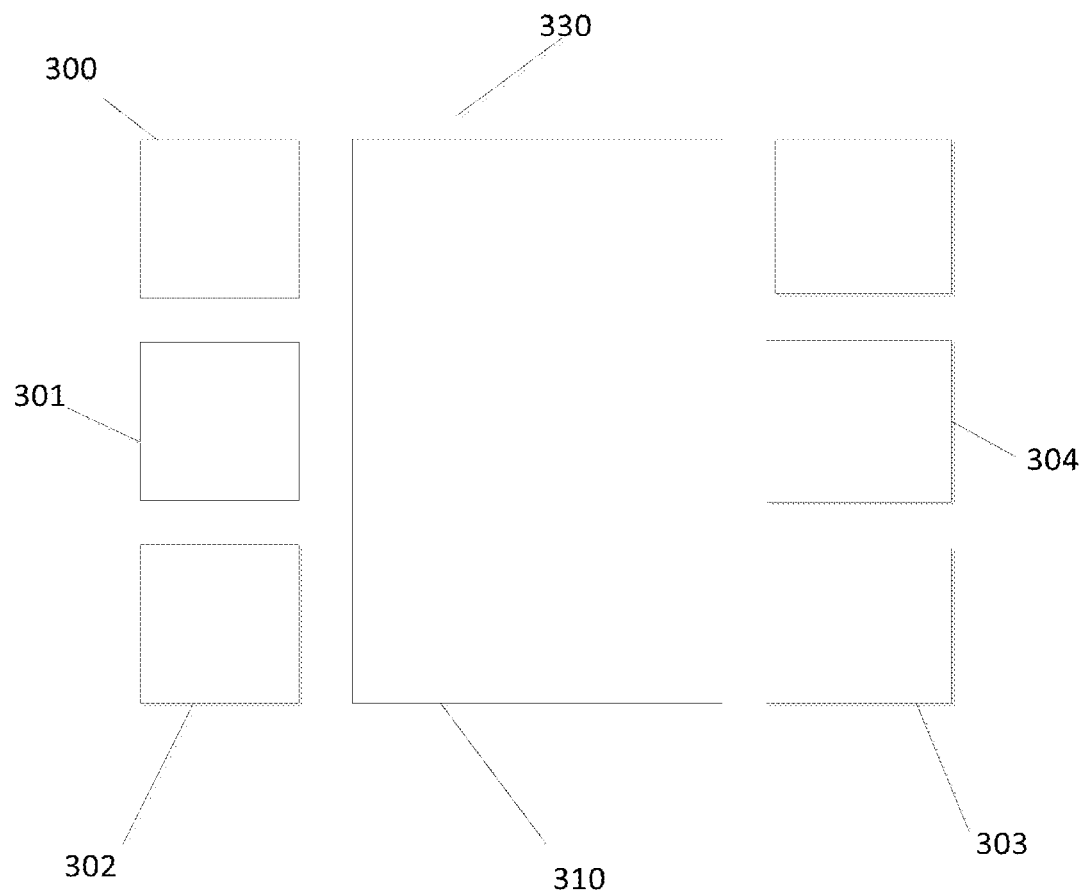
FIG. 3 is a screen shot of an interface that illustrates traversing between nodes in accordance with another embodiment.

In addition to taking into account the relative positioning of different nodes when determining a next node to focus on, embodiments of the present invention can also determine the next node based upon a traversal origin, as described in more detail below. FIG. 3 is a screen shot of an interface 330 that illustrates traversing between nodes in accordance with another embodiment. Nodes (300, 301, 302, 303, 304, and 310) can be traversed through in a horizontal or vertical direction. Referring to FIG. 3, assume that node 300 begins as the current node and also as the traversal origin. A traversal origin can generally be considered to be the node where the user last changed a traversal direction, as described in more detail below. Assume the user moves "down" twice, the current node then becomes node 302. Even though the current node has changed from node 300 to node 302, the traversal origin can remain as node 300 because the traversal direction (i.e., "down") has not changed. However, next, assume the user moves "right" so that the current node is then changed to node 310. In addition to changing the current node from node 302 to node 310, the traversal origin is changed from node 300 to node 302 because the traversal direction has changed from "down" to "right" at node 302. Therefore, the traversal origin changes based upon when the user changes a traversal direction.

To illustrate how a next node can be determined based on a traversal origin, assume that, in a first scenario, node 300 is a current node and a traversal origin. Next, assume the user moves "down" to node 301 (therefore, the current node is node 301 and the traversal origin remains as node 300). Next, assume the user moves "right" to node 310. The current node is then node 310, and the traversal origin becomes node 301 because the traversal direction has changed from "down" to "right." Next, assume the user moves "right" again from node 310. One embodiment will then choose node 304 as the next node to traverse to because node 304 is within the same row as traversal origin node

301. Therefore, in this first scenario, the next node 304 is determined based upon traversal origin node 301. Therefore, embodiments of the present invention can determine a next node based on column/row alignment with the traversal origin node. In this example, because the last movement was in a horizontal direction (i.e., "left" and "right"), the next node is a node that is row-aligned with the current node. However, in other examples where the last movement is in a vertical direction, the next node can be a node that is column-aligned with the current node.

In contrast to the above-described first scenario, assume that, in a second scenario, node 300 is a current node and a traversal origin. Next, assume that the user moves "down" twice to node 302. Therefore, the current node is node 302 and the traversal origin remains node 300. Next, like the first scenario, assume the user moves "right" to node 310. The current node is then node 310, and the traversal origin becomes node 302 because the traversal direction has changed from "down" to "right." Next, assume the user moves "right" again away from node 310. One embodiment will then choose node 303 as the next node to traverse to because node 303 is within the same row as traversal origin node 302. Therefore, in this second scenario, the next node 303 is determined based upon traversal origin 302.

Therefore, the first scenario and the second scenario each arrive at different next nodes. Specifically, the first scenario reaches a next node of 304 from node 310. However, the second scenario reaches a next node of 303 from node 310. Therefore, even though both the first scenario and the second scenario pass through node 310, the first scenario and the second scenario determine different next nodes because the first and the second scenario have different traversal origins (traversal origin node 301 for scenario 1 and traversal origin node 302 for scenario 2).

In addition to determining a next node based upon a traversal origin, one embodiment also determines a next node based upon the distances between a current node and the other nodes. One embodiment can perform some or all of the following calculations: (1) distances from a top-right portion of a current node to center-left portions of surrounding nodes; (2) distances from a top-right portion of a current node to bottom-left portions of surrounding nodes; (3) distances from a center of a current node to a top-left portion of surrounding nodes; (4) distances from a center of a current node to a top-center portion of surrounding nodes; and (5) distances from a center of a current node to a bottom-right portion of surrounding nodes. Embodiments can also determine a minimum distance between any part of a current node and any part of other nodes. Embodiments of the present invention can then choose a next node depending on which other node is closest to the current node, according to some or all of the above measurements. The node that is closest to the current node can correspond to the node with the absolute shortest distance of any of the measurements. Alternatively, the node that is closest to the current node can correspond to the node with the shortest average distance of a plurality of measurements If more than one node is determined to be the next node to traverse to, one embodiment can choose between the possible nodes based on the sizes of the nodes. For example, one embodiment can choose the possible node that is the larger node to be the next node to traverse to.

As described above, one embodiment can determine a next node based upon a determined traversal origin. However, in some circumstances, if the next node as determined by the traversal origin and the next node as determined by the distances are not the same node, one embodiment can override the determination as determined by the traversal origin. It may be preferable to override the determination as determined by the traversal origin if the distance between the current node and the node (determined by the distances) is so small that this very close node should be the next node.

Further, in one embodiment, multiple algorithms are used, and a prime traversal candidate is determined for each algorithm. If there is more than one prime traversal candidate, a "best-fit" traversal node is determined based on history and proximity, and the frequency in which the same node gets selected.

In one embodiment, one of more of the following algorithms are used to determine one or more traversal node candidates in response to receiving a directional command from a user:

(1) Reversing: if there is a valid history then there will be a reversing node, which is the previous node when the current directional command is the opposite of the previous directional command (e.g., down when the previous command is up). If there is a valid reversing node, then no other node is selected as the next focus node in one embodiment, regardless of whether other traversal node candidates are determined by the below algorithms.

(2) Current node Simple2D: the traversal node candidate is the node geometrically closest to the current node.

(3) Origin node Simple2D: the traversal node candidate is the node closest to the current node, but on the same axis ordinate as the traversal origin node of the traversal cycle.

(4) Current node, average distance on axis: the traversal node candidate is the average distance between the opposing corners and midpoints of the current node and the target, and a node at the current position on the traversal origin node's axis and the target node.

(5) Nearest on origin node axis: the traversal node candidate is the nearest node edge on the traversal axis, but closest in line with the traversal origin node.

(6) Nearest on the current axis: the traversal node candidate is the nearest node edge to the current node on the traversal axis, (7) Nearest top left corner: the traversal node candidate is the nearest top left corner node resulting from a corner to corner measurement for horizontal traversal.

(8) Nearest off-centered node on the traversal axis: the traversal node candidate is the nearest off-centered node on the traversal axis not in line, but in with a leading edge beyond this node's leading edge.

After first calculating the potential traversal candidates, as disclosed above, one embodiment then selects the best-fit based on history and proximity, and the frequency at which the same node gets selected. One or more of the following criteria is used to select the best-fit:

(1) If there is a "reversing" node, then the reversing node (i.e., the previous node when a reverse of the previous directional command) is selected as the traversal node.

(2) If all or most (e.g., three or more) of the following potential traversal candidates are the same node, then that node is selected as the traversal node:
Current node Simple2D;
Origin node Simple2D;
Current node average distance on Axis;
Nearest on origin node axis;
Nearest on the current axis.

(3) If there is no clear winner and if two of the above candidates are the same node, and the path between the current node and that node is clear (i.e., the path is not in any way obscured by a third node), then that node is selected as the traversal node.

(4) If a node blocks the traversal to a multiply selected node (i.e., the path between two nodes is a least partially obscured by a third node), then that node is selected as the traversal node. For example, assume node A and node B are exactly in the same column, and node B is below node A. Assume that part of node C is in the gap between the nodes. The column rules say that a down arrow should go from A to B, but because C "blocks" the path it gets the focus when the down arrow is received.

(5) If there are no multiply selected nodes then the priority order for selecting the traversal node is:
Nearest on origin node axis;
Origin node Simple2D;
Current node Simple2D;
Nearest on the current axis;
Current node average distance on Axis.

(6) The nearest top left corner is only used if the above candidates fail, and the current traversal direction is horizontal.

(7) The nearest off-centered node on the traversal axis is only selected if the above candidates fail, and the current traversal direction is vertical.

FIGS. 4-9 are screenshots that illustrate a comparison between a traversal between nodes using known prior art approaches and embodiments of the present invention. As shown in the screenshots, embodiments generate a next traversal node in non-grid layouts that is more "expected" by a user than prior art approaches.

Figure 4:
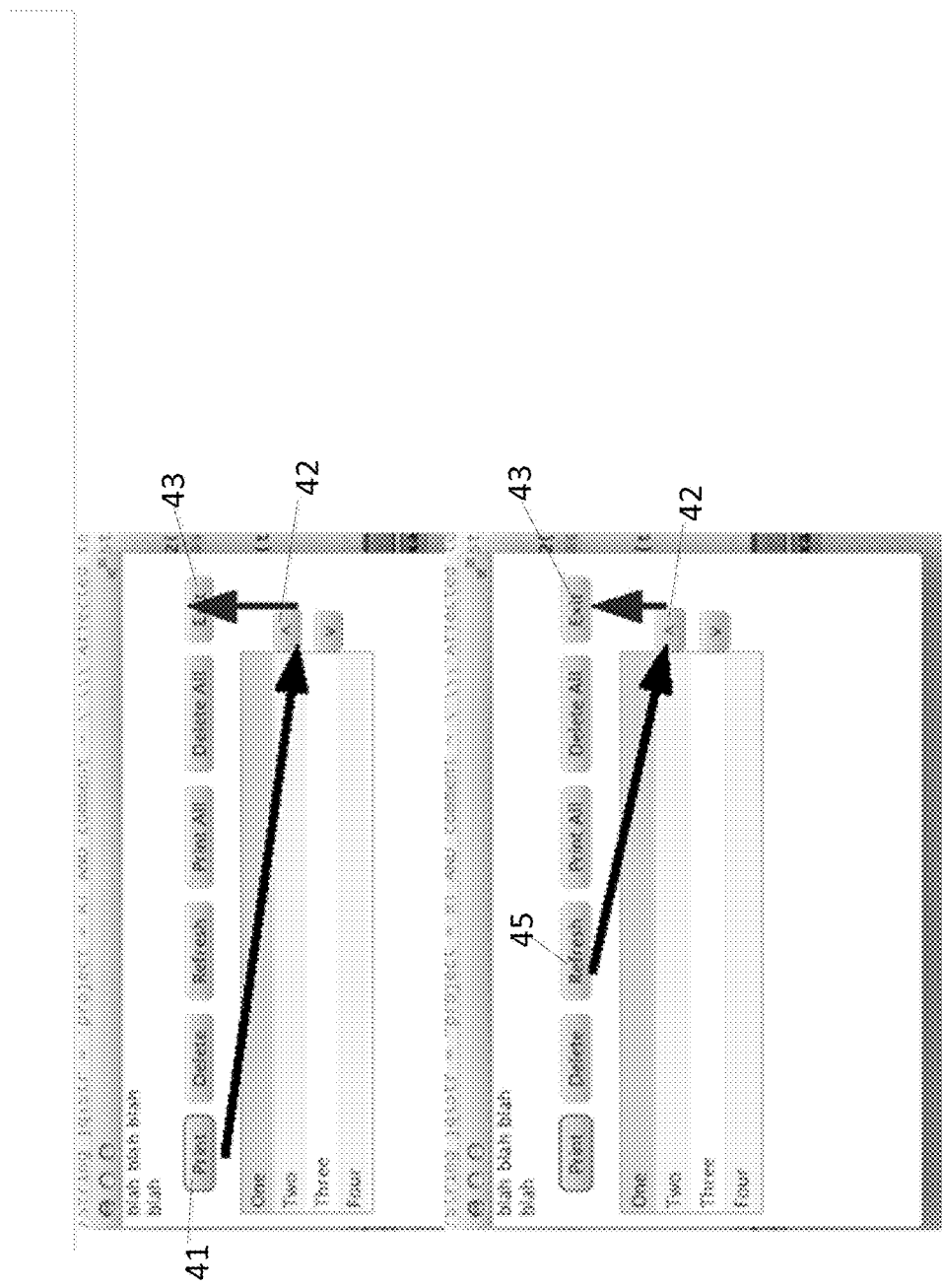
FIG. 4 illustrates two examples of traversal of nodes in accordance with the prior art.

FIG. 4 illustrates two examples of traversal of nodes in accordance with the prior art. In the upper example, traversal begins at node 41. In response to a down arrow, focus moves to node 42. In response to an up arrow, focus moves to node 43. In the lower example, traversal begins at node 45. In response to a down arrow, focus moves to node 42. In response to an up arrow, focus moves to node 43. Therefore, as shown in FIG. 4, the ending focus is at node 43 in both examples even when the starting node is different, and the ending focus is at a different node than the starting node even though two opposite commands were entered (i.e., a down arrow followed by an up arrow).

Figure 5:
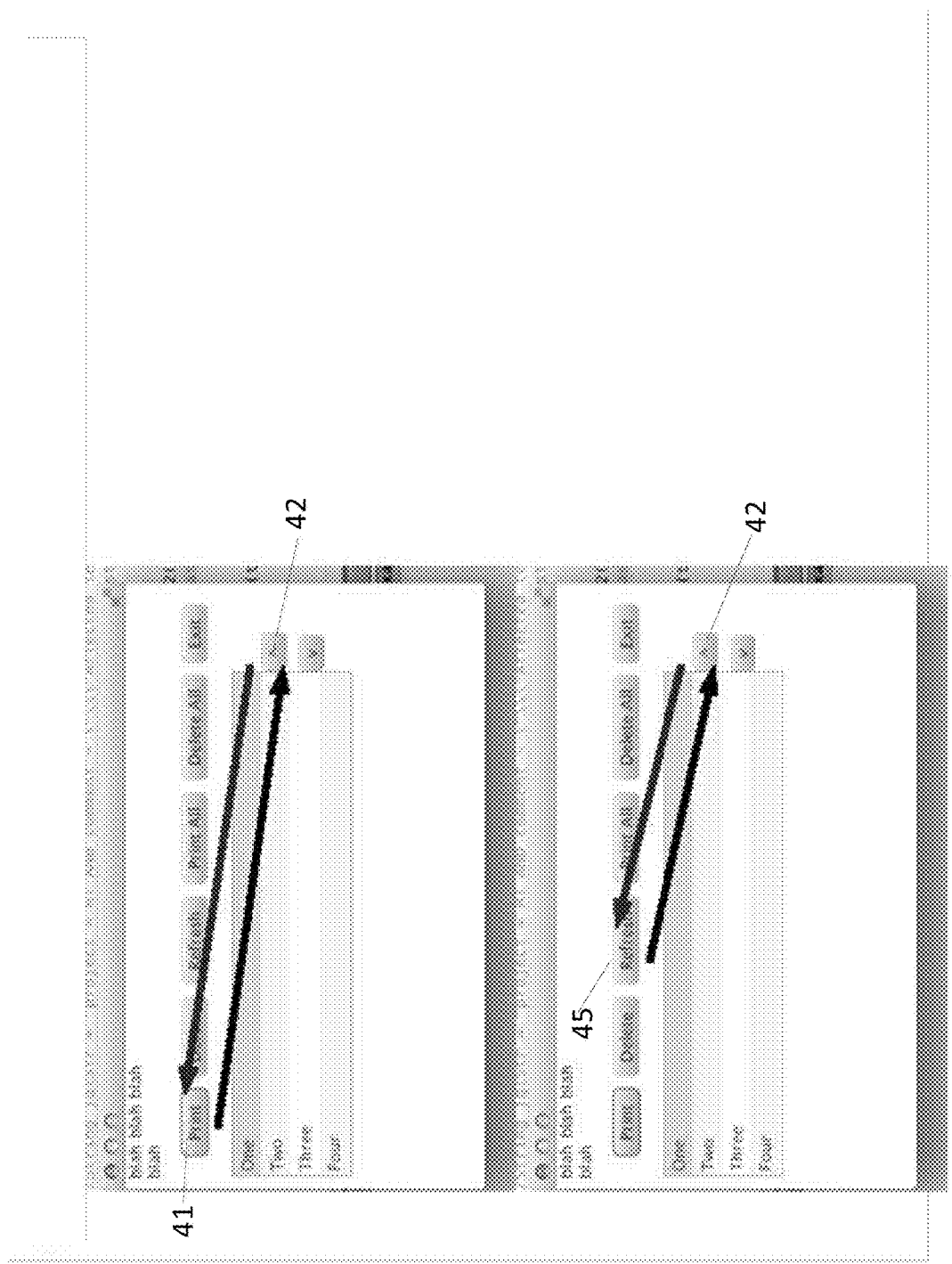
FIG. 5 illustrates two examples of traversal of nodes in accordance with embodiments of the present invention.

FIG. 5 illustrates two examples of traversal of nodes in accordance with embodiments of the present invention. In the upper example, traversal begins at node 41. In response to a down arrow, focus moves to node 42. In response to an up arrow, focus moves back to node 41. In the lower example, traversal begins at node 45. In response to a down arrow, focus moves to node 42. In response to an up arrow, focus moves back to node 45. Therefore, as shown in FIG. 5, in contrast to the prior art example of FIG. 4, after two opposite commands were entered (i.e., a down arrow followed by an up arrow), the focus ends up at the beginning node.

Figure 6:
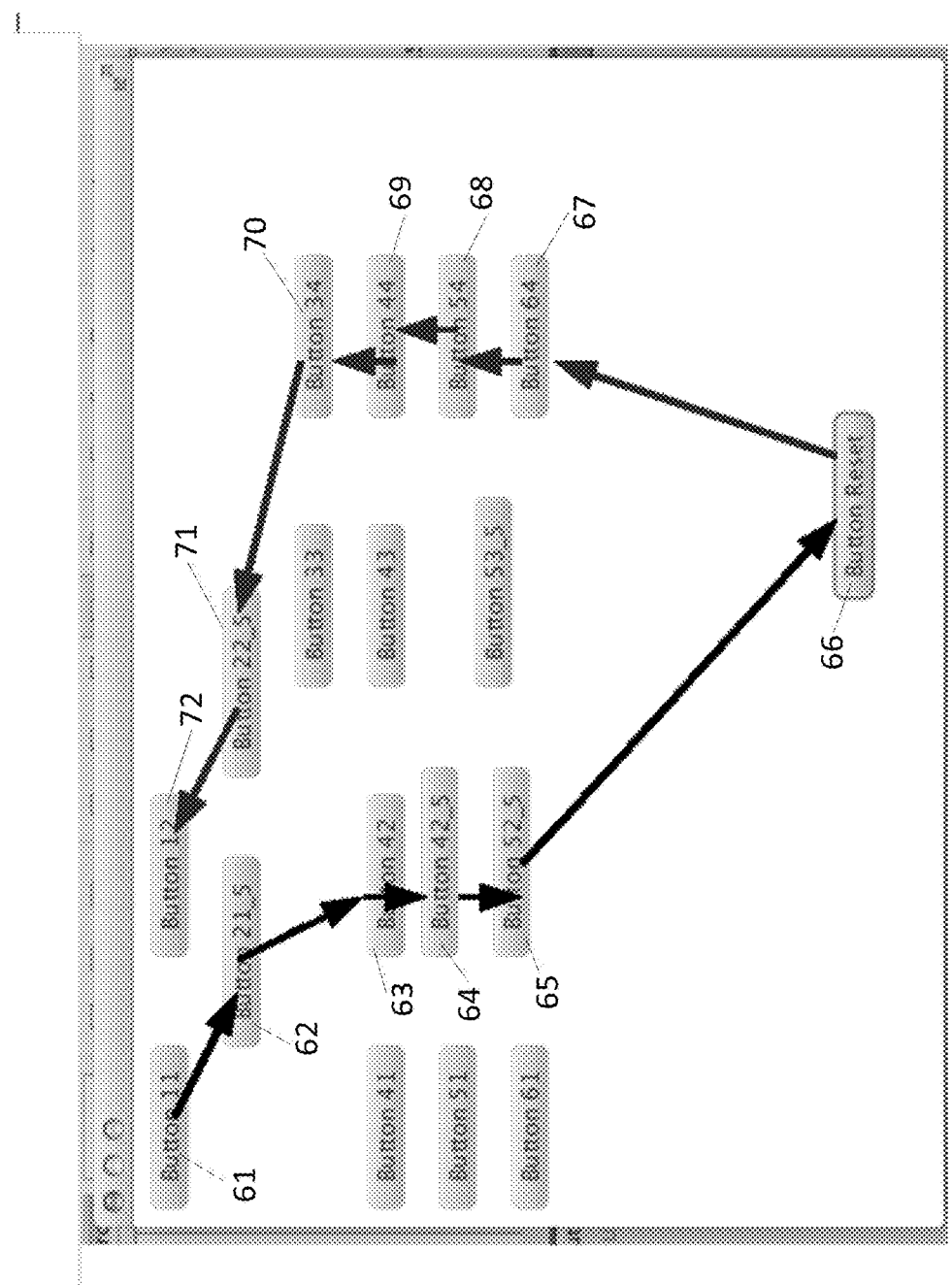
FIG. 6 illustrates an example of traversal of nodes in accordance with the prior art.

FIG. 6 illustrates an example of traversal of nodes in accordance with the prior art. In the example of FIG. 6, traversal begins at node 61 and in response to consecutive down arrow commands, the focus moves to node 62, node 63, node 64, node 65 and node 66. Then, in response consecutive up arrow commands, the focus moves to node 67, node 68, node 69, node 70, node 71 and finally node 72. Therefore, as shown in FIG. 6, the traversal in response to multiple down arrows followed by multiple up arrows results in multiple different focus nodes on the way down in comparison to the way up.

Figure 7:
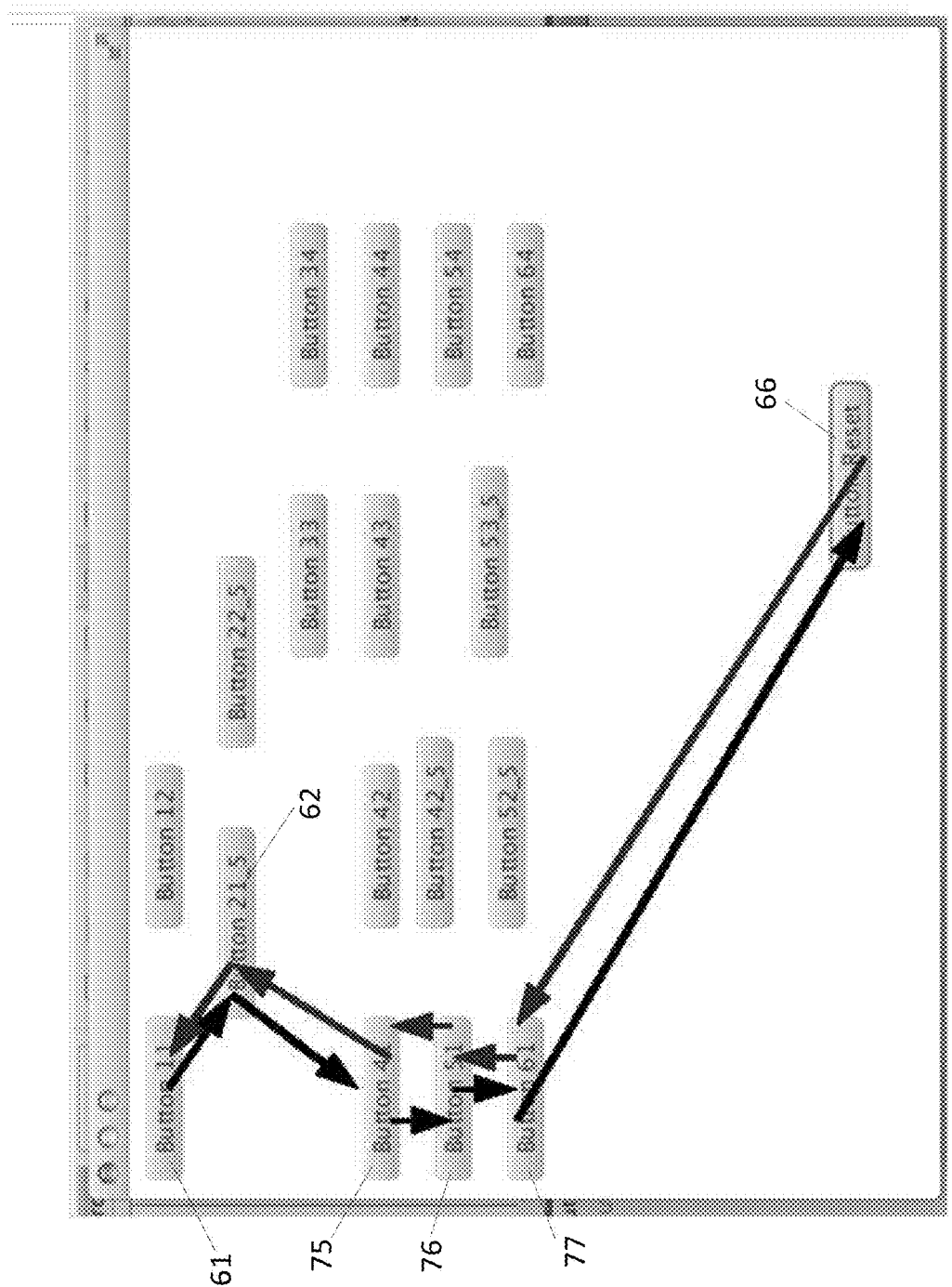
FIG. 7 illustrates an example of traversal of nodes in accordance with embodiments of the present invention.

FIG. 7 illustrates an example of traversal of nodes in accordance with embodiments of the present invention. In the example of FIG. 7, traversal begins at node 61 and in response to consecutive down arrow commands, the focus moves to node 62, node 75, node 76, node 77 and node 66. Then, in response to consecutive up arrow commands, the focus moves to node 77, node 76, node 75, node 62, and node 61. Therefore, in contrast to FIG. 6, in FIG. 7, multiple down arrows followed by multiple up arrows causes the focus to travel in identical opposite paths and end up at the same initial node 61.

Figure 8:
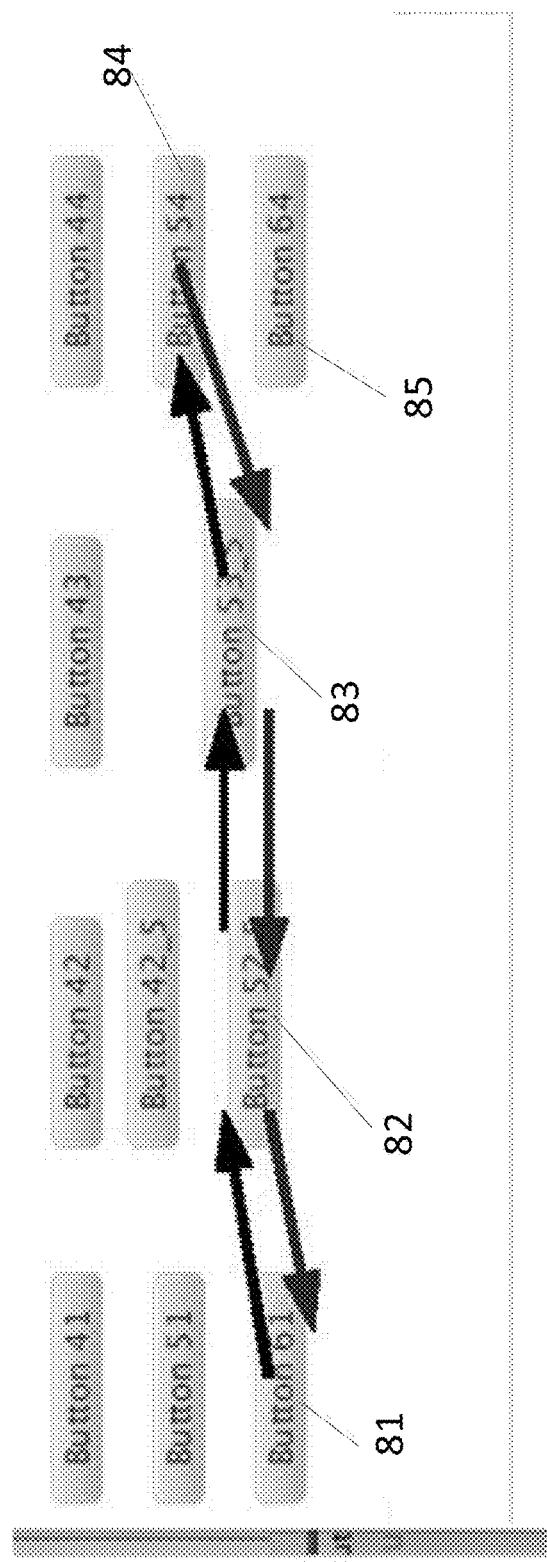
FIG. 8 illustrates an example of traversal of nodes in accordance with the prior art.

FIG. 8 illustrates an example of traversal of nodes in accordance with the prior art. In the example of FIG. 8, traversal begins at node 81 and in response to consecutive right arrow commands, the focus moves to node 82, node 83 and node 84. Then, in response consecutive left arrow commands, the focus moves to node 83, node 82 and finally node 81. However, the typical user, in response to pressing the right arrow three times starting at node 82 would likely expect and desire for the focus to end up at node 85 (i.e., shift across all nodes at the bottom). Instead, because in the prior art each intermediate step is calculated independently, the focus ends up at node 84.

Figure 9:
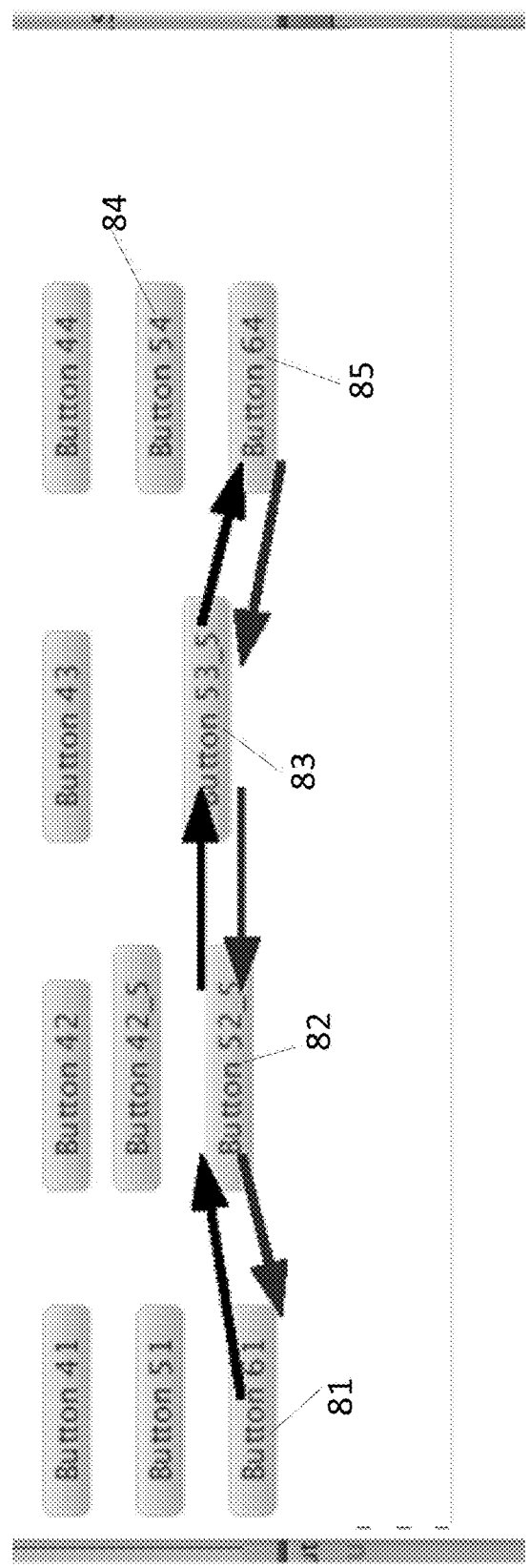
FIG. 9 illustrates an example of traversal of nodes in accordance with embodiments of the present invention.

FIG. 9 illustrates an example of traversal of nodes in accordance with embodiments of the present invention. In the example of FIG. 9, traversal begins at node 81 and in response to consecutive right arrow commands, the focus moves to node 82, node 83 and node 85. Then, in response consecutive left arrow commands, the focus moves to node 83, node 82 and finally node 81. In contrast to FIG. 8, in FIG. 9 in response to pressing the right arrow three times starting at node 82, the focus ends up at node 85 (i.e., shift across all nodes at the bottom).

Figure 10:
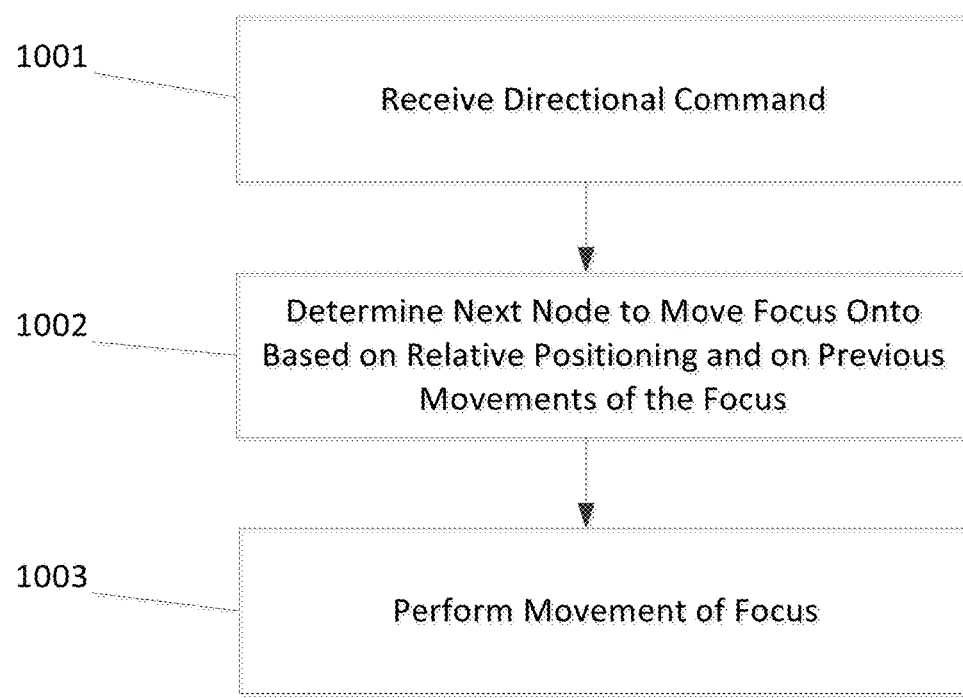
FIG. 10 is a flow diagram of the functionality of the node traversing module of FIG. 1 in accordance with one embodiment.

FIG. 10 is a flow diagram of the functionality of the node traversing module 16 of FIG. 1 in accordance with one embodiment. In one embodiment, the functionality of the flow diagram of FIG. 10 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 1001, one embodiment receives at least one directional command from a user. As described above, in one embodiment, the directional command can be in the "up" direction, "down" direction, "left" direction, or "right" direction, for example. The at least one directional command can be a command to move focus away from a current node. As described above, in one embodiment, the directional command can be used by the user to traverse between nodes within a user interface (e.g., interfaces 200 and 330 of FIGS. 2 and 3, respectively) accessed by system 10 of FIG. 1.

At 1002, one embodiment determines the next node to move the focus onto. The determining the next node can be based on the relative positioning between the current node and the other nodes. The determining the next node can also be based on previous movements of the focus that were performed prior to moving the focus onto the current node. As described above, determining the next node based on previous movements can include determining a traversal origin and choosing a next node that is aligned relative to the traversal origin. As described above, determining the next node based on the relative positioning between the current node and the other nodes can include calculating distances between the current node and the other nodes.

At 1003, one embodiment performs movement of the focus from the current node onto the next node.

As such, one embodiment of the present invention allows a user to traverse between nodes within a user interface by determining a next node to traverse to. Traversing between nodes can be the moving of a focus from one node to another node. Embodiments use a plurality of algorithms to determine a next node to focus upon after moving the focus away from a current node. The algorithms can take into account factors such as the distances between the nodes, the positioning of the nodes with respect to each other, the sizes of the nodes, and the previous traversal choices/movements performed by the user.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, cause the processor to traverse between nodes within a user interface, the traversing comprising:

storing a history of a previous traversal of a plurality of nodes, the plurality of nodes comprising more than two different nodes;

receiving a next directional command from a user, wherein the next directional command is a command to move a focus away from a current node, wherein the next directional command is received after receiving a plurality of previous directional commands during the previous traversal, wherein the plurality of previous directional commands comprise at least one of an up direction or a down direction, and comprise at least one of a left direction or a right direction;

determining a next node to move the focus onto in response to the next directional command by executing traversal algorithms that each may determine one or more traversal candidate nodes, the traversal algorithms comprising at least a reversal algorithm, a traversal origin algorithm and a relative positioning algorithm;

wherein the reversal algorithm comprises determining whether the next directional command is a reverse direction of a previous command that moved the focus to the current node from a first node during the previous traversal of the plurality of nodes based on the stored history, wherein the reversal algorithm determines the traversal candidate node as the first node when the next directional command is the reverse direction;

wherein the relative positioning algorithm comprises determining the traversal candidate node based on a relative positioning between the current node and the other nodes;

wherein the traversal origin algorithm comprises determining the traversal candidate node based on a traversal origin that comprises a previous node that was focused on when the user last changed a directional command comprising determining a node that is aligned within a row or column of the traversal origin;

determining the next node to move the focus onto in response to the next directional command from among a plurality of traversal candidate nodes from the executed algorithms, the determining comprising:

when the reversal algorithm generates a first traversal candidate node, the next node is the first traversal candidate node generated by the reversal algorithm and the reversal algorithm overrides all other traversal algorithms, wherein the reversal algorithm overrides all other traversal algorithms for two or more consecutive next directional commands when each of the two or more consecutive next directional commands is a reverse direction of the respective previous command over the previous traversal of the plurality of nodes;

when the reversal algorithm does not generate the first traversal candidate node, determining the next node among the traversal candidate nodes using a best fit determination; and performing movement of the focus from the current node onto the determined next node.

2. The computer readable medium of claim 1, wherein the best fit determination comprises determining if two or more of the traversal candidate nodes are identical nodes.

3. The computer readable medium of claim 1, wherein the best fit determination comprises determining the next node based on whether a path between the current node and the next node is clear.

4. The computer readable medium of claim 1, wherein the best fit determination comprises calculating distances between the current node and the other nodes, and determining a node that is closest to the current node.

5. The computer readable medium of claim 1, wherein the best fit determination comprises determining the relative sizes of the other nodes, and determining a largest node of the other nodes as the next node.

6. The computer readable medium of claim 1, wherein the relative positioning algorithm comprises at least one of: determining distances from a top-right portion of the current node to center-left portions of surrounding nodes; determining distances from the top-right portion of the current node to bottom-left portions of surrounding nodes; determining distances from a center of the current node to a top-left portion of surrounding nodes; determining distances from the center of the current node to a top-center portion of surrounding nodes; or determining distances from the center of a current node to a bottom-right portion of surrounding nodes.

7. The computer readable medium of claim 1, wherein the best fit determination comprises determining a frequency that each of the traversal candidate nodes was selected during previous traversals.

8. A computer-implemented method for traversing between nodes within a user interface, the method comprising:

storing a history of a previous traversal of a plurality of nodes, the plurality of nodes comprising more than two different nodes;

receiving a next directional command from a user, wherein the next directional command is a command to move a focus away from a current node, wherein the next directional command is received after receiving a plurality of previous directional commands during the previous traversal, wherein the plurality of previous directional commands comprise at least one of an up direction or a down direction, and comprise at least one of a left direction or a right direction;

determining a next node to move the focus onto in response to the next directional command by executing traversal algorithms that each may determine one or more traversal candidate nodes, the traversal algorithms comprising at least a reversal algorithm, a traversal origin algorithm and a relative positioning algorithm;

wherein the reversal algorithm comprises determining whether the next directional command is a reverse direction of a previous command that moved the focus to the current node from a first node during the previous traversal of the plurality of nodes based on the stored history, wherein the reversal algorithm determines the traversal candidate node as the first node when the next directional command is the reverse direction;

wherein the relative positioning algorithm comprises determining the traversal candidate node based on a relative positioning between the current node and the other nodes;

wherein the traversal origin algorithm comprises determining the traversal candidate node based on a traversal origin that comprises a previous node that was focused on when the user last changed a directional command comprising determining a node that is aligned within a row or column of the traversal origin;

determining the next node to move the focus onto in response to the next directional command from among a plurality of traversal candidate nodes from the executed algorithms, the determining comprising:

when the reversal algorithm generates a first traversal candidate node, the next node is the first traversal candidate node generated by the reversal algorithm and the reversal algorithm overrides all other traversal algorithms, wherein the reversal algorithm overrides all other traversal algorithms for two or more consecutive next directional commands when each of the two or more consecutive next directional commands is a reverse direction of the respective previous command over the previous traversal of the plurality of nodes;

when the reversal algorithm does not generate the first traversal candidate node, determining the next node among the traversal candidate nodes using a best fit determination; and performing movement of the focus from the current node onto the determined next node.

9. The method of claim 8, wherein the best fit determination comprises determining if two or more of the traversal candidate nodes are identical nodes.

10. The method of claim 8, wherein the best fit determination comprises determining the next node based on whether a path between the current node and the next node is clear.

11. The method of claim 8, wherein the best fit determination comprises calculating distances between the current node and the other nodes, and determining a node that is closest to the current node.

12. The method of claim 8, wherein the best fit determination comprises determining the relative sizes of the other nodes, and determining a largest node of the other nodes as the next node.

13. The method of claim 8, wherein the relative positioning algorithm comprises at least one of: determining distances from a top-right portion of the current node to center-left portions of surrounding nodes; determining distances from the top-right portion of the current node to bottom-left portions of surrounding nodes; determining distances from a center of the current node to a top-left portion of surrounding nodes; determining distances from the center of the current node to a top-center portion of surrounding nodes; or determining distances from the center of a current node to a bottom-right portion of surrounding nodes.

14. The method of claim 8, wherein the best fit determination comprises determining a frequency that each of the traversal candidate nodes was selected during previous traversals.

15. A system comprising:
a processor;
a non-transitory computer readable medium coupled to the processor and storing instructions; and
a user interface coupled to the processor;
wherein the instructions, when executed by the processor, cause the processor to display a plurality of nodes on the user interface, store a history of a previous traversal of a plurality of nodes, the plurality of nodes comprising more than two different nodes, and traverse between the nodes in response to receiving a next directional command from a user, wherein the next directional command is a command to move a focus away from a current node, wherein the next directional command is received after receiving a plurality of previous directional commands during the previous traversal, wherein the plurality of previous directional commands comprise at least one of an up direction or a down direction, and comprise at least one of a left direction or a right direction:

determining a next node to move the focus onto in response to the next directional command by executing traversal algorithms that each may determine one or more traversal candidate nodes, the traversal algorithms comprising at least a reversal algorithm, a traversal origin algorithm and a relative positioning algorithm;

wherein the reversal algorithm comprises determining whether the next directional command is a reverse direction of a previous command that moved the focus to the current node from a first node during the previous traversal of the plurality of nodes based on the stored history, wherein the reversal algorithm determines the traversal candidate node as the first node when the next directional command is the reverse direction;

wherein the relative positioning algorithm comprises determining the traversal candidate node based on a relative positioning between the current node and the other nodes;

wherein the traversal origin algorithm comprises determining the traversal candidate node based on a traversal origin that comprises a previous node that was focused on when the user last changed a directional command comprising determining a node that is aligned within a row or column of the traversal origin;

determining the next node to move the focus onto in response to the next directional command from among a plurality of traversal candidate nodes from the executed algorithms, the determining comprising:

when the reversal algorithm generates a first traversal candidate node, the next node is the first traversal candidate node generated by the reversal algorithm and the reversal algorithm overrides all other traversal algorithms, wherein the reversal algorithm overrides all other traversal algorithms for two or more consecutive next directional commands when each of the two or more consecutive next directional commands is a reverse direction of the respective previous command over the previous traversal of the plurality of nodes;

when the reversal algorithm does not generate the first traversal candidate node, determining the next node among the traversal candidate nodes using a best fit determination; and performing movement of the focus from the current node onto the determined next node.

16. The system of claim 15, wherein the best fit determination comprises determining if two or more of the traversal candidate nodes are identical nodes.

17. The system of claim 15, wherein the best fit determination comprises determining the next node based on whether a path between the current node and the next node is clear.

18. The system of claim 15, wherein the best fit determination comprises calculating distances between the current node and the other nodes, and determining a node that is closest to the current node.

19. The system of claim 15, wherein the best fit determination comprises determining the relative sizes of the other nodes, and determining a largest node of the other nodes as the next node.

20. The system of claim 15, wherein the relative positioning algorithm comprises at least one of: determining distances from a top-right portion of the current node to center-left portions of surrounding nodes; determining distances from the top-right portion of the current node to bottom-left portions of surrounding nodes; determining distances from a center of the current node to a top-left portion of surrounding nodes; determining distances from the center of the current node to a top-center portion of surrounding nodes; or determining distances from the center of a current node to a bottom-right portion of surrounding nodes.

* * * * *

UNITED STATES PATENT AND TRADEMARK OFFICE
CERTIFICATE OF CORRECTION

| | |
|---|---|
| PATENT NO. | : 10,275,109 B2 |
| APPLICATION NO. | : 13/899022 |
| DATED | : April 30, 2019 |
| INVENTOR(S) | : Fleming et al. |

Page 1 of 1

It is certified that error appears in the above-identified patent and that said Letters Patent is hereby corrected as shown below:

In the Specification

In Column 5, Line 57, delete "measurements" and insert -- measurements. --, therefor.

In Column 6, Line 41, delete "axis," and insert -- axis. --, therefor.

Signed and Sealed this
Twenty-first Day of July, 2020

Andrei Iancu
*Director of the United States Patent and Trademark Office*